United States Patent
Dalal et al.

(10) Patent No.: US 8,943,232 B2
(45) Date of Patent: Jan. 27, 2015

(54) SYSTEM METHOD FOR ENUMERATING CLIENT DEVICES EMBEDDED IN A USER DEVICE DURING REBOOT, WAKE UP OR RESTART OF USER DEVICE

(75) Inventors: Anand Dalal, San Jose, CA (US); Jonathan J. Andrews, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/458,501

(22) Filed: Apr. 27, 2012

(65) Prior Publication Data

US 2013/0290572 A1 Oct. 31, 2013

Related U.S. Application Data

(63) Continuation of application No. 13/044,399, filed on Mar. 9, 2011, now Pat. No. 8,190,798.

(51) Int. Cl.
  *G06F 13/10* (2006.01)
  *G06F 9/44* (2006.01)
  *G06F 9/445* (2006.01)
  *G06F 3/00* (2006.01)

(52) U.S. Cl.
  USPC ............ 710/10; 710/5; 710/8; 710/9; 710/11; 710/62; 710/72; 710/19

(58) Field of Classification Search
  USPC ........................................ 710/8–11, 62, 72, 5
  See application file for complete search history.

(56) References Cited

U.S. PATENT DOCUMENTS

| | | | |
|---|---|---|---|
| 6,389,495 B1 | 5/2002 | Larky et al. | |
| 6,493,770 B1 | 12/2002 | Sartore et al. | |
| 7,093,031 B2 | 8/2006 | Ray et al. | |
| 7,433,991 B2 | 10/2008 | Fujita et al. | |
| 7,653,759 B2 | 1/2010 | Sugaya | |
| 7,704,147 B2 | 4/2010 | Quraishi et al. | |
| 8,190,798 B1 * | 5/2012 | Dalal et al. ................ | 710/62 |
| 8,341,621 B2 * | 12/2012 | Brockway et al. ............ | 717/176 |
| 8,473,666 B2 * | 6/2013 | Cohen et al. .................. | 710/313 |
| 8,595,717 B2 * | 11/2013 | Chang et al. .................. | 717/173 |
| 2011/0246678 A1 | 10/2011 | Wu et al. | |
| 2011/0320639 A1 * | 12/2011 | Ulenas ............................. | 710/5 |

FOREIGN PATENT DOCUMENTS

JP 2009193358 8/2009

* cited by examiner

*Primary Examiner* — Tammara Peyton
(74) *Attorney, Agent, or Firm* — Fish & Richardson P.C.

(57) ABSTRACT

A host device can enable operation with a client device based on stored or cached enumeration information. The enumeration information can be initially received from the client device during a first configuration process, and stored or cached in volatile and/or non-volatile storage accessible by the host device. During subsequent configuration processes, operation with the client device can be enabled based on the stored or cached enumeration information. Operation between the host device and the client device can be facilitated through a communication protocol, such as the universal serial bus (USB) protocol. A host device and client device can be connected via a traditional USB or USB High Speed Inter-Chip (HSIC) connection.

15 Claims, 5 Drawing Sheets

SYSTEM METHOD FOR ENUMERATING CLIENT DEVICES EMBEDDED IN A USER DEVICE DURING REBOOT, WAKE UP OR RESTART OF USER DEVICE

CROSS-REFERENCES TO RELATED APPLICATIONS

This application is a continuation of and claims the benefit of U.S. patent application Ser. No. 13/044,399 filed Mar. 9, 2011, entitled "Client Device Configuration Based On Information Stored By Host Device," now U.S. Pat. No. 8,190,798, issued on May 29, 2012, the disclosure of which is incorporated by reference herein in its entirety.

BACKGROUND

The present disclosure relates generally to host devices enabling operation with client devices based on enumeration information, and in particular to host devices enabling operation with client devices using enumeration information stored or cached by the host devices.

Computing devices have been in use for several decades. Examples of computing devices include, for example, desktop computers, laptop computers, mobile phones, smartphones, tablet devices, portable multimedia players, global positioning system devices, video game players, personal digital assistants (PDAs), portable email devices, multifunction devices, and/or the like. Examples of multi-function devices include various iPhone™ and iPod™ models manufactured and sold by Apple Inc., assignee of the present application. Computing devices can be used for performing a wide variety of tasks, from the simple to some of the most complex.

In some instances, two computing devices can be configured to communicate with one other. For example, two computing devices can be connected and communicate over a printed circuit board ("PCB") trace or cable. To facilitate communication between computing devices, it is common to rely on standard communication protocols, such as the universal serial bus (USB) protocol. The USB specification requires that in order for operation between a host device and client device to be enabled, a configuration process must occur. In some instances, a configuration process can include a client device providing enumeration information (e.g., information about the client device) to the host device, and the host device enabling operation with the client device based on the provided enumeration information.

BRIEF SUMMARY

According to various embodiments of the present invention, a host device can enable operation with a client device based on stored or cached enumeration information. In some embodiments, enumeration information can be received by the host device during a first configuration process and stored or cached in volatile and/or non-volatile storage. In some embodiments, communication between a host and client device can be facilitated by a communication protocol, such as the universal serial bus (USB) protocol.

For example, a host device and client device can be components (e.g., an applications processor and a co-processor respectively) embedded in a printed circuit board (e.g., motherboard) of a smartphone. The host and client devices can be connected via a set of printed circuit board traces, which can be implemented according to the USB High Speed Inter-Chip (HSIC) standard. When the smartphone is powered on, the host device can initiate a configuration process with the client device. During the configuration process, the client device can provide enumeration information to the host device. The host device can thereafter enable operation with the client device based on the received enumeration information. The host device can additionally cache or store the enumeration information in volatile (e.g., dynamic random access memory) and/or in non-volatile storage (e.g., hard drive, flash memory, etc.). During subsequent configuration processes, the host device can retrieve the enumeration information stored in its volatile and/or non-volatile storage to enable operation with the client device. Subsequent configuration processes can occur if the client device becomes unconfigured. A client device can become unconfigured by being turned off and on, suspended and woken up, restarted, rebooted, etc.

These and other embodiments of the invention along with many of its advantages and features are described in more detail in conjunction with the text below and attached figures.

DETAILED DESCRIPTION OF THE INVENTION

Figure 1:
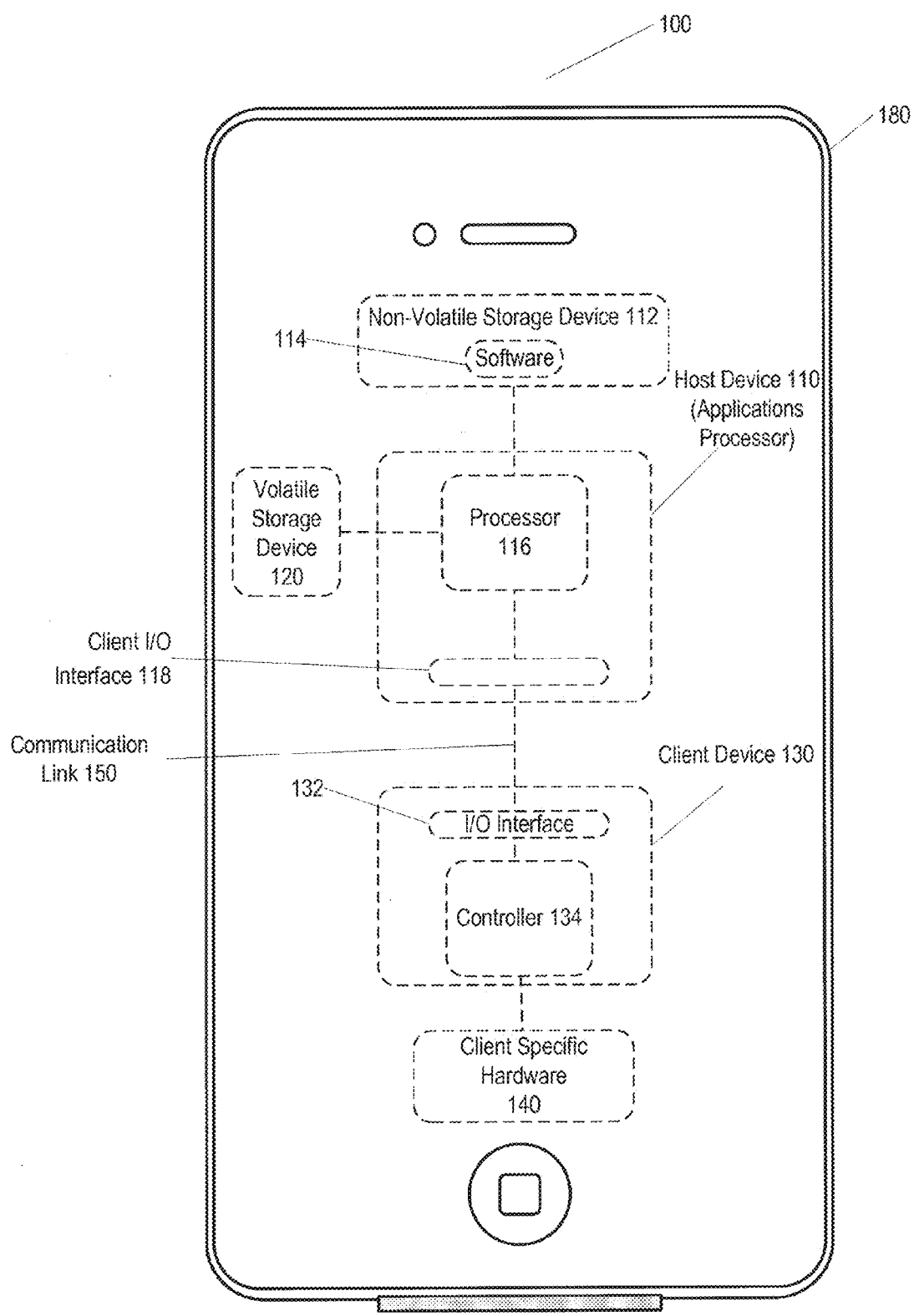
FIG. 1 illustrates a system including a host device connected to a client device according to an embodiment of the present invention.

Some embodiments of the present invention provide techniques usable by a host device to quickly enable operation with a client device based on stored or cached enumeration information. In some embodiments, the enumeration information can be received from the client device during a first configuration process, and stored or cached in volatile and/or non-volatile storage accessible by the host device. During subsequent configuration processes, the host device can enable operation with the client device based on the stored or cached enumeration information. In some embodiments, communication between the host device and the client device can be facilitated through a communication protocol, such as the universal serial bus (USB) protocol.

Illustratively, a host device and a client device can be components of a multi-function device, such as an iPhone™ device manufactured and sold by Apple Inc. After powering on the multi-function device, the host device can detect the presence of the client device and initiate a configuration process. During the configuration process, the host device can determine if enumeration information for the client device has been previously stored or cached in its locally accessible volatile and/or non-volatile storage. If enumeration information for the client device has not been previously stored or cached, the host device can perform an enumeration process. In particular, the host device can request and receive enumeration information from the client device. Based on the received enumeration information, the host device can enable operation with the client device. The host device can further store or cache the received enumeration information in its volatile (e.g., dynamic random access memory) and/or non-volatile storage (e.g., hard disk, flash memory, etc.). During operation of the multi-function device, the client device can be temporarily powered off in order to conserve energy. After the client device is powered back on, the host device can initiate a subsequent configuration process. Because the host device previously stored the client device's enumeration information, the host device can use the stored enumeration information to enable operation with the client device instead of repeating the enumeration process.

In certain embodiments, a host device can be any suitable computing device without limitation. In some embodiments, a host device can be a component of a personal computer, laptop computer, tablet device, multimedia device, cellular phone, smartphone, global positioning system (GPS) device, gaming device, multi-function device, printer, household device, a smart hub device that permits two or more devices to communicate with one another, any portable or non-portable electro-mechanical device and/or the like. For example, a host device can be a single chip (integrated circuit) applications processor within a smartphone device that is configured to interact with various other co-processors or components of the smartphone device. In other embodiments, a host device can be a personal computer, laptop computer, tablet device, multimedia device, cellular phone, smartphone, global positioning system (GPS) device, gaming device, multi-function device, printer, household device, a smart hub that permits two or more devices to communicate with one another, any portable or non-portable electro-mechanical device and/or the like.

In certain embodiments, a client device can be any suitable device capable of communicating with a host device without limitation. In some embodiments, a client device can be a component of a personal computer, laptop computer, tablet device, multimedia device, cellular phone, smartphone, global positioning system (GPS) device, gaming device, multi-function device, wireless communications device, modem, external speaker, external display, input device, printing device, and/or the like. For example, a client device can be a single chip (integrated circuit) co-processor that manages hardware providing mobile telephone network communications (voice and/or data), WiFi communications (e.g., IEEE 802.11 family standards), and/or short-range technology communications (e.g., Bluetooth). In other embodiments, a client device can be a tablet device, multimedia device, cellular phone, smartphone, global positioning system (GPS) device, gaming device, multi-function device, wireless communications device, modem, external speaker, external display, input device, printing device, and/or the like.

In certain embodiments, a host device can communicate with a client device via a communication link. In some embodiments, a host device can communicate with a client device via a path that includes more than one communication link. For example, a host device can be connected to a hub device (e.g., a device that allows a single connection from a host device to connect to multiple client devices) via a first communication link. The hub device can then be connected to a client device via a second communication link. During operation, communications between the host and client devices can pass through the first communication link, hub device, and second communication link.

Communication links can be any suitable connection type. For example, a host device can be connected to a client device via a direct connection to a USB High-Speed Inter-Chip (HSIC) port, a USB port, a serial port, a parallel port, an Ethernet port, and/or the like. A host device can also be connected to a client device via a wireless medium such as WiFi or Bluetooth. With respect to USB HSIC, these connections are standard connection types optimized for chip-to-chip communications over short distances. USB HSIC connections are designed to reduce cost, power requirements, complexity, and manufacturing risk. In the majority of circumstances, USB HSIC connections are used to enable communication between chips on a single PCB.

As discussed, communication between a host and client device can be based on the universal serial bus (USB) protocol. The USB protocol, which was developed in the 1990s, can enable a single USB host device to access the various functionalities provided by one or more USB client devices. To enable operation between a USB host device and a USB client device, the USB protocol requires a configuration process, which includes an enumeration process, to occur. During the enumeration process, the host device can request and receive configuration information, also referred to as enumeration information, from the USB client device. Enumeration information can include USB descriptors, which provide information about the attributes and functions of the USB client device. Based on the enumeration information, the USB host device can establish operation with the USB client device. For example, the USB, host device can load software drivers for the client device and/or the like. After this process is completed, the USB host device can signal to the USB, client device that operation is enabled by assigning the USB client device a configuration value.

Under the USB protocol, a host device can be required to initiate a configuration process each time a client device becomes unconfigured. A client device can be unconfigured if it is turned off and back on, restarted, rebooted, suspended and subsequently woken up, disconnected and later reconnected to the host device, etc. For example, a USB host device and a USB client device can be connected components of a smartphone. During operation of the smartphone, the USB host and client devices can be enabled for operation as a result of an initial configuration process. The smartphone can be later turned off and turned back on. Upon being turned back on, a subsequent configuration process, including an enumeration process, can be required in order for the USB host and client device to be enabled for operation.

As discussed, embodiments of the present invention can permit a host device to perform a fast configuration of a client device based on stored or cached enumeration information. By using stored or cached enumeration information, the total time for a host device to configure a client device can be shortened as compared to host devices that rely on enumeration information received from a client device through an enumeration process. Embodiments of the present invention, by using stored or cached enumeration information, can eliminate the need to wait for enumeration information to be received from a client device. Instead, enumeration information can be retrieved quickly from relatively fast volatile and/or non-volatile storage. As a result, the total time to enable operation with a client device can be reduced.

The following description primarily refers to communications using the USB protocol. However, one skilled in the art will appreciate that the techniques disclosed in this specification are equally applicable to other types of communication protocols. The following descriptions also primarily refer to communications over USB and USB HSIC connections. However, one skilled in the art will appreciate that the techniques disclosed in this specification are equally applicable to other types of connections, such as wired and wireless connections.

FIG. 1 illustrates a system 100 including a host device connected to a client device according to an embodiment of the present invention. The system shown in FIG. 1 includes a host device 110, a volatile storage device 120, a client device 130, a communication link 150, non-volatile storage device 112, and client specific hardware 140. Although the system of FIG. 1 shows only one host device, one client device, one communication link, one volatile storage device, one non-volatile storage device, and one client specific hardware, any suitable number of these entities (including zero) can be included. For example, host device 110 can be connected to multiple client devices including, a first client device that manages WiFi communications and a second client device that manages mobile telephone communications.

In some embodiments, host device 110, volatile storage device 120, client device 130, non-volatile storage device 112, and client specific hardware 140 can be wholly or partially enclosed within a housing 180. Housing 180 can be made of any suitable material. For instance, housing 180 can be made of plastic, metal, glass, ceramics, wood, and/or the like. In certain embodiments, the host device 110 and client device 130 can be implemented on or embedded in the same printed circuit board (e.g., motherboard) within housing 180. For example, host device 110 and client device 130 can each be a chip embedded in the motherboard of a multi-function device. Communication link 150, which connects the host device 110 and client device 130, can be, for example, one or more traces on a printed circuit board (PCB).

In some embodiments, host device 110 can include a processor 116 and a client I/O interface 118. In some embodiments, host device 110 can be implemented as one or more integrated circuits (including e.g., a conventional microprocessor or microcontroller). For example, host device 110 can be a single chip applications processor that integrates processor 116 and client I/O interface 118. Host device 110 can further be connected to non-volatile storage device 112 and volatile storage device 120 in any suitable manner.

Processor 116, which can be implemented as one or more integrated circuits, can control the operation of host device 110. For example, in response to user input signals provided via a user interface (not shown), processor 116 can perform various tasks such as selecting and playing media assets that can be stored in non-volatile storage device 112, interacting with client devices to access various client device functionalities (e.g., accessing a mobile telephone network, the Internet, local area network, external speakers, external displays, and/or the like), executing various software programs 114 (e.g., operating systems and applications) residing on non-volatile storage device 112, and so on.

Client I/O interface 118 can include one or more ports. Each port can include a number of signal paths configured to carry various signals between host device 110 and client device 130. In some embodiments, each port can include a number of signal paths sufficient for facilitating communication based on a communication protocol. For example, a port can include a number of signal paths suitable for communication using the USB protocol. Other protocols can also be used provided that client I/O interface 118 supports the same protocol as I/O interface 132 of client device 130. In some embodiments, client I/O interface 118 can be a USB HSIC interface.

Non-volatile storage device 112 can be any type of non-volatile memory. For example, non-volatile storage device 112 can be implemented e.g., using magnetic disk, optical disk, flash memory, or any other non-volatile storage medium. Non-volatile storage device 112 can store software programs 114 that are executable by processor 116, including operating systems and related program code (not explicitly shown) that can be used in managing communications with various client devices, e.g., as described below and/or software programs. Non-volatile storage device 112 can also store any other type of information such as various media assets, information about a user's contacts (names, addresses, phone numbers, etc.), scheduled appointments and events, notes, and/or other information. In some embodiments, host device 110 can receive configuration information (e.g., enumeration information) from client device 130, and such information can be stored in non-volatile storage device 112. Configuration information can include, for example, a set of USB descriptors and any other data suitable for enabling operation with client device 130.

Volatile storage device 120 can be implemented using any type of volatile memory. For instance, volatile storage device 120 can be any suitable volatile memory medium such as any variants of dynamic random access memory (DRAM) and static random access memory (SRAM). Volatile storage device 120 can further store client device configuration information. For example, volatile storage device 120 can store enumeration information including a set of USB descriptors and any other data suitable for enabling operation with client device 130.

In some embodiments, configuration information can be initially stored in non-volatile storage device 112 during an initial enumeration process. The information can be stored such that the information persists across multiple boot-ups of host device 110 and/or system 100. For example, the configuration information can be stored during manufacturing of system 100. The stored information can thereafter be used to configure a client device during the lifetime of system 100. In other embodiments, the configuration information can be stored for only the current operating session of host device 110 and/or system 100. Illustratively, configuration information can be received from a client device during a boot-up process and stored in volatile storage device 120. Thereafter, if host device 110 and/or system 100 is rebooted or restarted, the configuration information must again be received from the client device.

Software programs 114 (also referred to as software herein) can include any program executable by processor 116. In some embodiments, certain software programs can be installed on host device 110 by its manufacturer, while other software programs can be installed by a user. Examples of software programs 114 can include operating systems, productivity applications, video game applications, personal information management applications, applications for playing media assets and/or navigating a media asset database, applications for controlling a telephone interface to place and/or receive calls, and so on. Certain software programs 114 can provide communication with and/or control of client devices, and certain software programs 114 can be responsive to control signals or other input from client device 130.

In some embodiments, client device 130 can include an I/O interface 132 and controller 134. In certain embodiments, client device 130 can be implemented as one or more integrated circuits. For example, client device 130 can be a single chip digital signal processing (DSP) co-processor integrating I/O interface 132 and controller 134. In some embodiments, client device 130 can be connected to client specific hardware 140 in any suitable manner.

I/O interface 132 can include a number of signal paths configured to carry various signals between client device 130 and host device 110. In some embodiments, the I/O interface 132 can include a number of signal paths sufficient for facilitating communication based on a communication protocol.

For example, the I/O interface 132 can include a number of signal paths suitable for communication using the USB protocol. Other protocols can also be used provided that I/O interface 132 supports the same protocol as client I/O interface 118 of host device 110. In some embodiments, I/O interface 132 can be a USB HSIC interface.

Controller 134 can execute program code to manage the various functions of client specific hardware 140, such as managing mobile phone communications (voice and/or data), WiFi communications, short-range (e.g., Bluetooth) communications, digital audio decoding, analog or digital audio and/or video processing, processing of user input, controlling the functionality of client specific hardware 140 and the like. Controller 134 can also manage communication with host device 110 via I/O interface 132. For example, mobile telephone voice data from the client specific hardware 140 can be received by controller 134 and subsequently relayed to host device 110.

Client specific hardware 140 can represent any hardware needed to enable any desired functionality.

In some embodiments, client specific hardware 140 can include network and/or communication interfaces. The network and/or communication interfaces can provide voice and/or data communication capability for host device 110. In some embodiments, the network and/or communication interfaces can include wireless transceivers (e.g., using mobile telephone technology such as GSM or CDMA, advanced data network technology such as 3G or EDGE, WiFi (IEEE 802.11 family standards), Bluetooth, or other mobile communication technologies, or any combination thereof), GPS receiver components, and/or other components for accessing wireless voice and/or data networks. In some embodiments, the network and/or communication interfaces can provide wired network connectivity in addition to or instead of a wireless interface. The network and/or communication interfaces can be implemented using any suitable combination of hardware (e.g., antennas, modulators/demodulators, encoders/decoders, and other analog and/or digital signal processing circuits).

In other embodiments, client specific hardware 140 can include an RF receiver (e.g., for FM, AM, satellite radio, and/or other bands) and/or an RF transmitter (e.g., a short-range transmitter for personal use). In still other embodiments, client specific hardware 140 can include powered speakers, image displays (e.g., LCDs), input devices, printing devices, etc.

In some embodiments, client specific hardware 140 can include components of a user interface. Thus, an application executing on host device 110 can receive user input from client specific hardware 140, provide output to a user via client specific hardware 140, and/or control, interact with, or respond to any operation that client specific hardware is capable of performing.

Accordingly, client specific hardware 140 can encompass any hardware component for which interoperability with a computing and/or communication device can be desirable.

I/O interfaces 118 and 132 can allow host device 110 to be connected to client device 130 via communication link 150. Communication link 150 can enable data to be transferred between host device 110 and client device 130 using any suitable communication protocol (e.g., the USB protocol). In certain embodiments, communication link 150 can be any suitable connection type. For example, communication link 150 can be a USB HSIC connection. Communication link 150 can further be implemented in any suitable manner. For example, communication link 150 can be implemented as traces on a PCB, a cable, an interconnect wire, a connection over a wireless medium, and/or the like.

In some embodiments, communication link 150 can be placed in a suspended or low power mode. Suspending communication link 150 can cause the communication link to use less power relative to when the communication link is active (e.g., enabled for communication). For example, when communication link 150 is suspended, it can draw minimal or no power from host device 110.

In some embodiments, client device 130 can draw power from host device 110 via communication link 150. As such, when communication link 150 is suspended, client device 130 can likewise be suspended. In other embodiments, client device 130 can draw power from a source other than host device 110. As a result, client device 130 can remain active while communication link 150 is suspended. It should be noted that in such embodiments, client device 130 can also independently suspend itself.

In certain embodiments, communication link 150 can be switched from a suspended mode to an active mode by either host device 110 or client device 130. Upon activating or "waking up" communication link 150, operation between host device 110 and client device 130 can resume. In some embodiments, in order for operation to be resumed, host device 110 can be required to initiate a configuration process with client device 130.

Figure 2:
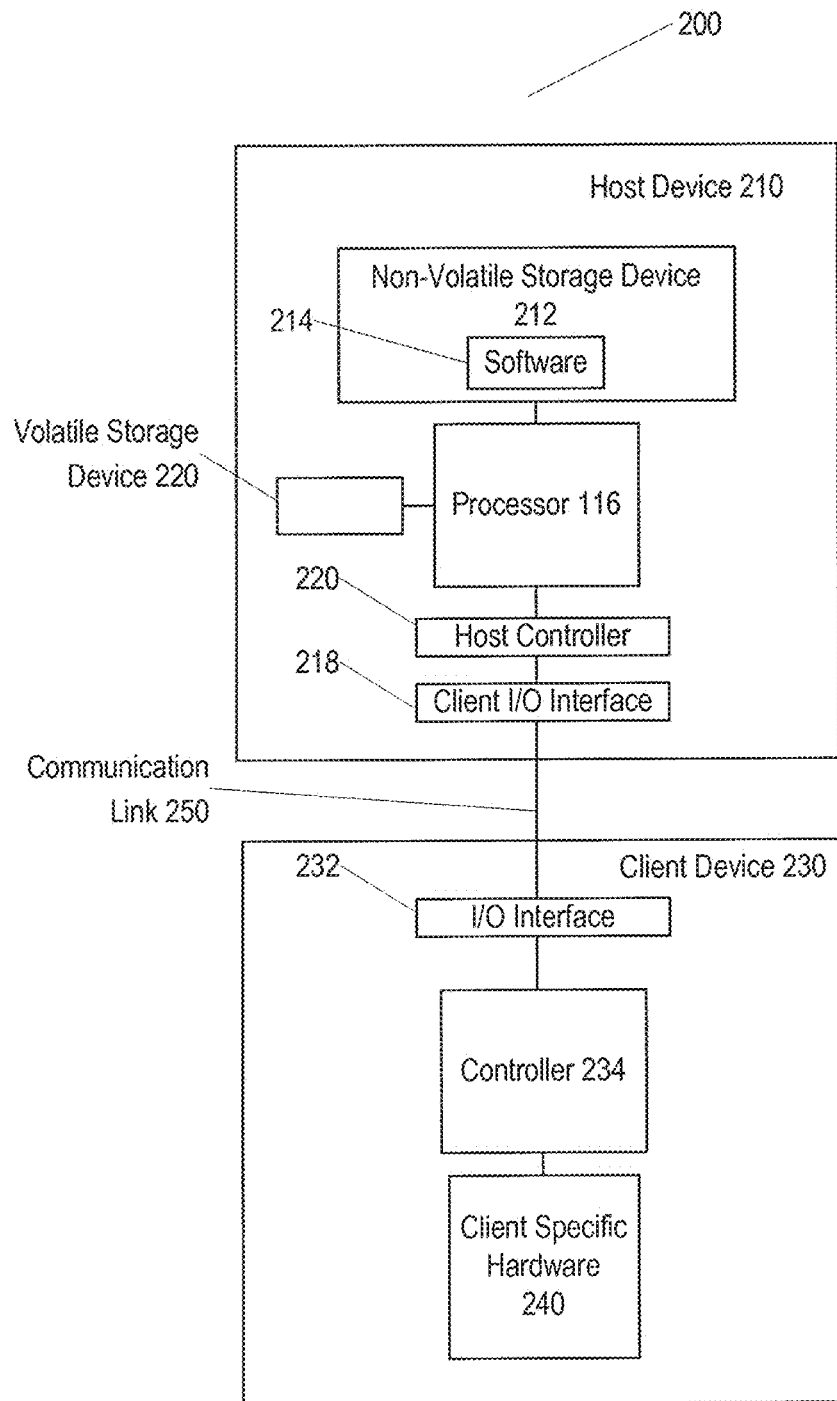
FIG. 2 illustrates a system including a host device connected to a client device according to another embodiment of the present invention.

In some embodiments, a host device and a client device can be embedded in separate PCBs or in separate housings. For example, FIG. 2 illustrates a system 200 including a host device connected to a client device according to another embodiment of the present invention. The system illustrated in FIG. 2 can be similar to the system illustrated in FIG. 1. However, in some embodiments, host device 210 and client device 230 can be enclosed in separate housings. For example, host device 210 can be a portable multimedia device and client device 230 can be an external accessory, such as a speaker. In other embodiments, host device 210 and client device 230 can be enclosed in a common housing but embedded in different PCBs. Although the system of FIG. 2 shows only one host device, one client device, one communication link, one volatile storage device, one non-volatile storage device and one client specific hardware, any suitable number (including zero) of these entities can be included.

Referring to FIG. 2, host device 210 can be similar to host device 110. Non-volatile storage device 212 can be similar to non-volatile storage device 112. Software 214 can be similar to software 114. Processor 216 can be similar to processor 116. Client I/O interface 218 can be similar to client I/O interface 118. Client I/O interface 218 can be any suitable interface for facilitating communication using the USB or any other communication protocol. For example, client I/O interface 218 can include a connector that can be coupled to a USB cable. Client device 230 can be similar to client device 130. Controller 234 can be similar to controller 134. I/O interface 232 can be similar to I/O interface 132. I/O interface 232 can be any suitable interface for facilitating communication using the USB or any other communication protocol. Client specific hardware 240 can be similar to client specific hardware 140. Volatile storage device 220 can be similar to volatile storage device 120. Communication link 250 can be similar to communication link 150. FIG. 2 further shows that host device 210 can include non-volatile storage device 212 and volatile storage device 220, and client device 230 can include client specific hardware 240.

In some embodiments, communication link 250 can be implemented as a USB cable, serial cable, etc., allowing host and client devices to be connected or disconnected by a user.

It will be appreciated that the devices shown in FIGS. 1 and 2 are illustrative and that variations and modifications are possible. For example, the host devices shown in FIGS. 1 and 2 can be indirectly connected to multiple client devices via a hub.

As described above, a host device and a client device can communicate using a communication protocol. In some embodiments, the communication protocol can be the USB protocol. Under the USB protocol, enabling operation between a host device and client device occurs via a configuration process, which includes an enumeration process. The configuration process can be initiated through the host device sending a reset signal to the client device upon sensing the presence of the client device. The data rate of the client device can be determined during the reset signaling. After reset, the host device can initiate an enumeration process. In particular, the client device's enumeration information (e.g., information about the functionality of the client device, attributes, etc.) can be requested and read by the host device and the client device can be assigned a unique 7-bit address. If the client device is supported by the host device, device drivers for the client device can be loaded and the client device can be set to a configured state. If a client device becomes unconfigured at a later time, the configuration process, including the enumeration process, can be repeated by the host device. A client device can become unconfigured if it is powered down and back on, suspended and woken up, restarted, rebooted, disconnected and reconnected to the host device, etc. A client device can also become unconfigured if its host device is powered down and back on, restarted, rebooted, disconnected and reconnected to the client device, etc. In instances where the host device is powered down and back on, restarted, or rebooted, the configuration process can be repeated for all connected client devices.

A client device's enumeration information can include one or more USB descriptors. The descriptors can define a client device's attributes, supported device configurations, supported interfaces, and the like. Descriptors can include a device and one or more configuration, interface, endpoint, and string descriptors.

Figure 3:
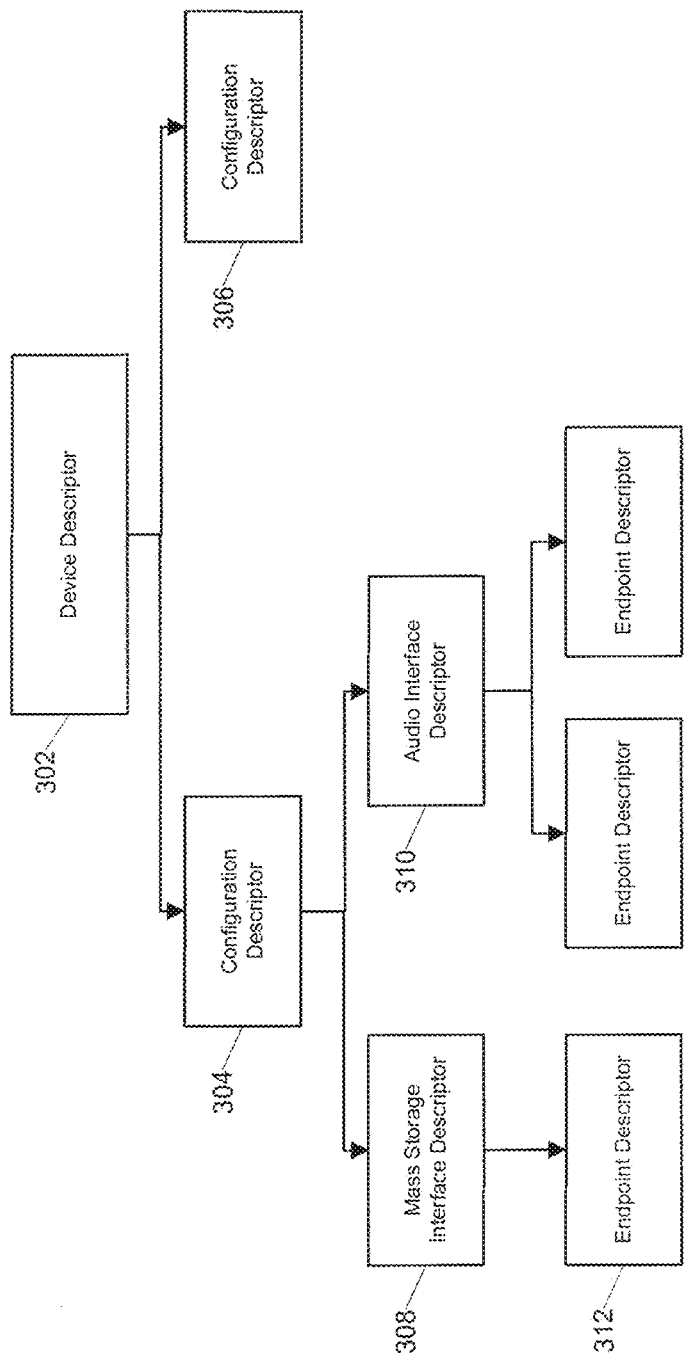
FIG. 3 is a hierarchical diagram illustrating an exemplary set of USB descriptors that can be included in a client device's enumeration information according to an embodiment of the present invention.

FIG. 3 illustrates a hierarchical diagram of an exemplary set of USB descriptors that can be included in a client device's enumeration information according to an embodiment of the present invention. The set of USB descriptors can include a device descriptor 302. Device descriptor 302 can provide information about the client device's vendor, product identifier, revision, etc. Device descriptor 302 can be associated with one or more configuration descriptors, such as configuration descriptors 304 and 306. A client device with more than one configuration descriptor can indicate that the client device supports more than one functionality. For example, a client device can have a first configuration associated with a camera functionality and a second configuration associated with a mass storage device functionality. Configuration descriptors 304 and 306 can provide information about the number of supported interfaces, device power requirements, etc. Each configuration descriptor can additionally be associated with one or more interface descriptors. For instance, configuration descriptor 304 can be associated with interface descriptors 308 and 310. The interface descriptors can provide information about the different interfaces supported by the client device. Interfaces can facilitate the communication of certain types of information between a host and client device. For example, an audio interface can be used to communicate sound information between a host and client device. Interface descriptors can be associated with one or more endpoint descriptors. For instance, FIG. 3 shows that interface descriptors 308 and 310 can be associated with one and two endpoint descriptors respectively. Endpoint descriptors can provide information about the endpoint that is to facilitate the communication of information for the client device. Endpoint descriptors can identify, for example, an endpoint address, a data transfer type, and a polling interval. Any number of interfaces and endpoints can be defined within each configuration.

Examples of processes that can be used to enable operation with a client device based on stored or cached enumeration information will now be described.

Figure 4:
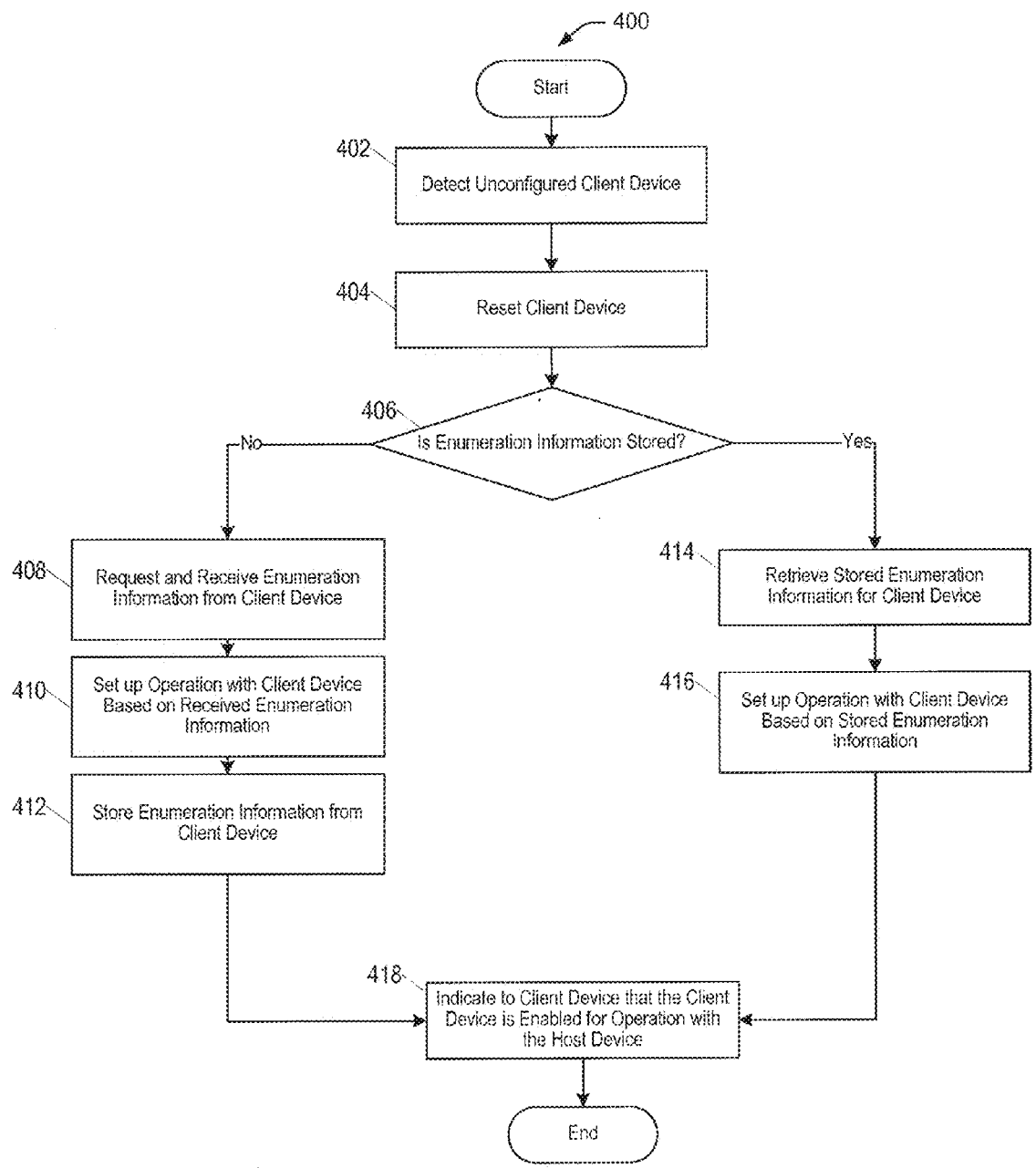
FIG. 4 is a flow diagram of a process usable by a host device for enabling operation with a client device according to an embodiment of the present invention.

FIG. 4 is a flow diagram of a process 400 for enabling operation with a client device according to an embodiment of the present invention. Process 400 can be performed by e.g., host device 110 of FIG. 1. Communication among the various entities in process 400 can be facilitated by any suitable communication protocol, such as the USB protocol. Process 400 can be used, in certain embodiments, to communicate with a USB client device.

At block 402, host device 110 can detect an unconfigured client device 130 (i.e. client device not enabled for operation) connected to it via a port of client I/O interface 118. Client I/O interface 118 can be connected to client device 130 through any suitable connection type. For example, client I/O interface 118 can be connected to client device 130 through a USB HSIC or traditional USB connection. In certain embodiments, host device 110 can perform detection of client device 130 in any suitable manner. For instance, host device 110 can detect client device 130 according to the specifications provided by USB and/or USB HSIC standards.

In some embodiments, host device 110's detection of unconfigured client device 130 can be caused by a triggering event. For example, host device 110 and client device 130 can be components of a smartphone. Powering on the smartphone can cause client device 130 to become active and cause host device 110 to detect client device 130's presence. As another example, host device 110 and client device 130 can again be components of a smartphone. Host device 110 can be enabled for operation with client device 130 after the smartphone is powered on. During operation of the smartphone, client device 130 can be suspended or powered down in order to conserve power. At a later time, client device 130 can be woken up from suspension or powered back on, which can cause host device 110 to detect client device 130's presence. It should be noted that because client device 130 was previously suspended or powered down, host device 110 can consider client device 130 to be unconfigured.

After detecting unconfigured client device 130, host device 110 can initiate a configuration process. Through the configuration process, host device 110 can set up or enable operation with client device 130. For example, host device 110 can be a single chip (integrated circuit) applications processor of a smartphone. Client device 130 can be a single chip DSP co-processor of the smartphone that can provide mobile telephone communication capabilities to host device 110. Host device 110 and client device 130 can be embedded in a single PCB and connected by a PCB trace or set of PCB traces according to USB HSIC standards. By performing a configuration process, host device 110 can enable operation with and access the mobile telephone communication capabilities provided by client device 130.

At block 404, host device 110 can begin a configuration process by resetting client device 130. By resetting client device 130, host device 110 can cause client device 130 to operate in its default state. While client device 130 is in its default state, host device 110 can communicate with client device 130 using a default device address.

At block 406, host device 110 can determine whether enumeration information for client device 130 has been stored or cached in volatile storage device 120 and/or non-volatile storage device 112. Host device 110 can make such a determination in any suitable manner. In some embodiments, host device 110 can determine the port to which client device 130 has been connected. Based on the port, host device 110 can determine whether enumeration information for client device 130 is stored in volatile storage device 120 and/or non-volatile storage device 112. For example, host device 110 can search for enumeration information, based on an identifier for the port (e.g., port number), in a database or look-up table stored in volatile storage device 120 and/or non-volatile storage device 112. In cases where the physical connection between the host device and the client device is essentially permanent (e.g., devices mounted or embedded in a PCB), the same client can be presumed to be connected to a particular port.

If it is determined that enumeration information for client device 130 is not located in volatile storage device 120 and/or non-volatile storage device 112, host device 110 can initiate an enumeration process at block 408. In particular, host device 110 can request and receive enumeration information from client device 130. In some embodiments, the enumeration process can include multiple requests and responses for enumeration information.

In some embodiments, host device 110 can begin the enumeration process by sending a request for all or a portion of client device 130's enumeration information. For example, host device 110 can send a descriptor request (e.g., a USB "Get Descriptor" request) to client device 130. Host device 110 can receive, in response to the request, a portion or all of client device 130's enumeration information. For instance, host device 110 can receive the whole or a portion of client device 130's device descriptor. The host device 110 can use the enumeration information to determine, for example, the maximum packet size supported by client device 130's default endpoint (i.e. endpoint 0).

In certain embodiments, as part of the enumeration process, host device 110 can, again, reset client device 130. After the second reset, host device 110 can assign a unique 7-bit address to client device 130 (e.g., by sending a USB "Set Address" request). From this point forward, host device 110 can communicate with client device 130 based on the assigned address. Following assignment of the address, host device 110 can request and receive all (or a portion necessary to enable operation) of client device 130's enumeration information. For example, host device 110 can send a descriptor request to client device 130 (e.g., a USB "Get Descriptor" request). Based on the request, host device 110 can receive client device 130's device descriptor. In some embodiments, the device descriptor can include the number of configurations supported by the client device and other basic information. After receiving the device descriptor, host device 110 can request, from client device 130, each of the client device's configuration descriptors, and receive, in response, the configuration descriptors and any subordinate descriptors (i.e., interface, endpoint, and string descriptors). In some embodiments, host device 110 can repeatedly send requests to client device 130 until all (or a portion sufficient to enable operation) of client device 130's enumeration information is obtained.

At block 410, host device 110 can setup operation with client device 130 based on the enumeration information received from client device 130 during the enumeration process. For example, host device 110 can use the enumeration information to determine and load drivers for client device 130, etc.

At block 412, host device 110 can cache or store the enumeration information received from client device 130. The enumeration information can be stored or cached in any suitable manner. For example, host device 110 can store or cache the enumeration information in volatile storage device 120. By storing or caching the enumeration information in volatile storage device 120, host device 110 can quickly retrieve the enumeration information at a later time during the operation of host device 110. In some embodiments, host device 110 can additionally or alternatively store the enumeration information in non-volatile storage device 112. Storing the enumeration information in non-volatile storage device 112 allows the enumeration information to be retrieved even after the host device 110 has been powered down or rebooted. For example, host device 110 can store the enumeration information in a database or look-up table residing on a file system of non-volatile storage device 112. At a later time, host device 110 (or the entire device within which host device 110 is contained) can be powered down and powered back on. Because the enumeration information was previously stored in non-volatile storage device 112, host device 110 can retrieve the enumeration information despite having been powered down. In some embodiments, upon boot up (e.g., starting an operating system executed by processor 116), host device 110 can automatically retrieve all stored enumeration information on non-volatile storage device 112 and cache the enumeration information in volatile storage device 120. For example, upon a boot-up, host device 110 can cache or store, in volatile storage device 120, the enumeration information for three (or any other number of) separate client devices.

In some embodiments, the enumeration information can be stored or cached based on the port to which client device 130 is connected. For example, if client device 130 is connected to port A of client I/O interface 118, host device 110 can store the enumeration information based on an identifier for port A in a database or look-up table residing on non-volatile storage device 112 and/or volatile storage device 120.

Referring again to block 406, if it is determined that enumeration information for client device 130 is stored or cached in volatile storage device 120 and/or non-volatile storage device 112, host device 110 can retrieve the enumeration information for client device 130 at block 414. For example, host device 110 can retrieve a database or look-up table record containing the enumeration information from a database or look-up table residing on non-volatile storage device 112 and/or volatile storage device 120. In some embodiments, host device 110 can retrieve the database or look-up table record based on the port to which client device 130 is connected. As another example, host device 110 can retrieve client device 130's enumeration information from a file residing on non-volatile storage device 112 and/or volatile storage device 120. In certain embodiments, the file can be identified by a database or look-up table record associated with the port to which client device 130 is connected.

Based on the retrieved enumeration information, host device 110 can setup operation with client device 130 at block 416. In some embodiments, host device 110 can assign client device 130 a unique 7-bit address (e.g., by sending a USB "Set Address" request). From this point forward, host device 110 can communicate with host device 130 using the assigned address. After or in parallel to the assignment of the unique address, host device 110 can set up operation with client device 130 based on the retrieved enumeration information.

For example, host device 110 can use the enumeration information to identify and load the proper drivers for client device 130, etc.

By enabling operation with stored or cached enumeration information (which can be retrieved relatively quickly), host device 110 can configure a connection or link to a client without the added transaction time associated with requesting and receiving enumeration information from client device 130. As a result, the total time for performing a configuration process can be reduced.

In some embodiments, host device 110 can, nonetheless, receive enumeration information from client device 130 in order to maintain compatibility (e.g., client device 130 can be a USB client device that requires host devices to initiate an enumeration process). In such embodiments, the enumeration information received from client device 130 can be ignored or not used by host device 110. Instead, host device 110 can begin the process of enabling operation using stored or cached enumeration information while waiting to receive enumeration information from client device 130. Thus, total time to perform an enumeration can still be reduced.

At block 418, host device 110 can send a configuration value to client device 130 indicating that client device 130 is in the "configured state" and enabled for operation with host device 110. Once operation is enabled, host device 110 can access the functionality provided by client device 130.

Figure 5:
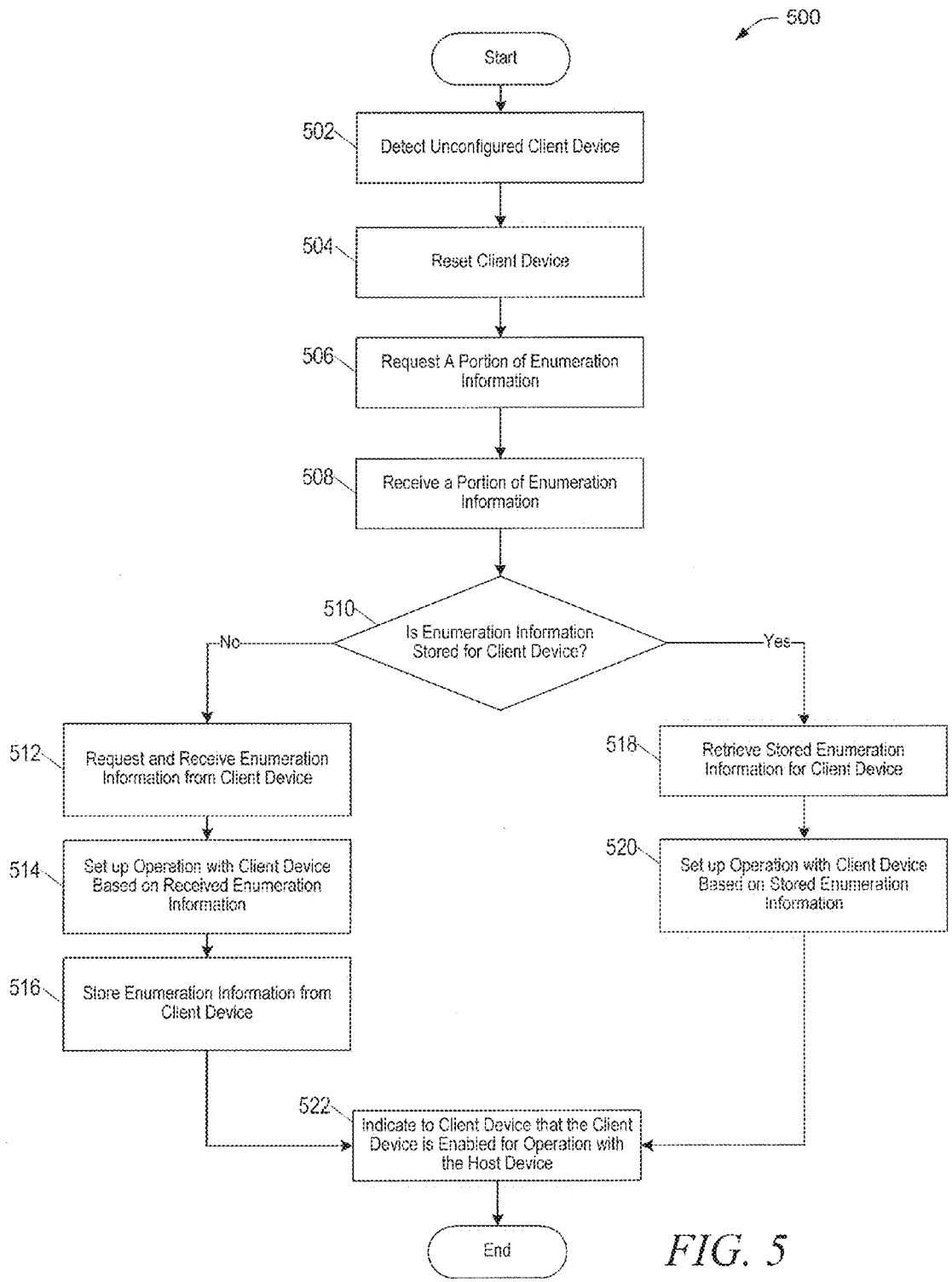
FIG. 5 is a flow diagram of a process usable by a host device for enabling operation with a client device according to another embodiment of the present invention.

In some embodiments, a host device can be connected to different client devices at different times through the same port. For example, a host device can be a laptop computer. At a first time, a user can connect a portable multimedia player to the laptop computer's USB port. At a later time, the user can disconnect the portable multimedia player, and in its place, connect an external speaker. In such embodiments, enumeration information cannot be stored based solely on the port to which a client device is connected. Otherwise, the incorrect enumeration information can be used. FIG. 5 is a flow diagram of a process 500 for enabling operation with a client device, in situations where different client devices can be connected to the same port, according to another embodiment of the present invention. Process 500 can be performed by e.g., host device 210 of FIG. 2. Communication among the various entities in process 500 can be facilitated by any suitable communication protocol, such as the USB protocol. Process 500 can be used, in certain embodiments, to communicate with a USB client device. Blocks 502, 504, 510, 512, 514, 516, 518, 520, and 522 can be similar to blocks 402, 404, 406, 408, 410, 412, 414, 416, and 418 respectively of process 400.

At block 506, host device 210 can request a portion of client device 230's enumeration from client device 230. For example, host device 210 can send client device 230 a descriptor request (e.g., a USB "Get Descriptor" request). At block 508, host device can receive, in response to the request, a portion of client device 230's enumeration information. For instance, host device 210 can receive the whole or a portion of client device 230's device descriptor. The host device 210 can use the received enumeration information to determine, for example, the maximum packet size supported by client device 230's default endpoint (i.e. endpoint 0). In some embodiments, the received enumeration information can include device identifiers. Device identifiers can include, for instance, identifiers for client device 230's vendor, product, device, manufacturer, serial number, and/or the like.

At block 510, host device 210 can use the information (e.g., device identifiers) provided by the information received from client device 230 to determine whether enumeration information for client device 230 has been previously stored or cached in volatile storage device 220 and/or non-volatile storage device 212. For example, host device 210 can use a vendor identifier, product identifier, device identifier, manufacturer identifier, product identifier, serial identifier, and/or any combination thereof to perform a search for enumeration information in a database or look-up table residing on non-volatile storage device 212 and/or volatile storage device 220. By requesting only a portion of host device 210's enumeration information (e.g., the whole or a portion of client device 230's device descriptor), the amount of time spent receiving and requesting enumeration information can be minimized until it is determined whether enumeration information for client device 230 is stored.

As discussed, block 516 can be similar to block 412. However, the enumeration information can be stored or cached based on any suitable device identifier, such as a vendor identifier, product identifier, device identifier, manufacturer identifier, product identifier, serial identifier, and/or in combination thereof.

It should be appreciated that the processes shown in FIGS. 4 and 5 are illustrative and that variations and modifications are possible. Blocks described as sequential can be executed in parallel, order of blocks can be varied, and blocks can be modified, combined, added, or omitted. Furthermore, one of ordinary skill in the art will recognize that the processes shown in FIGS. 4 and 5 can be implemented for other host devices.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof Processes can communicate using a variety of techniques including but not limited to conventional techniques for interprocess communication, and different pairs of processes can use different techniques, or the same pair of processes can use different techniques at different times. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable storage media; suitable media include magnetic disk or tape, optical storage media such as compact disk (CD) or DVD (digital versatile disk), flash memory, and the like. Computer readable media encoded with the program code can be packaged with a compatible electronic device, or the program code can be provided separately from electronic devices (e.g., via Internet download).

Thus, although the invention has been described with respect to specific embodiments, it will be appreciated that the invention is intended to cover all modifications and equivalents within the scope of the following claims.

What is claimed is:

1. A method comprising:
enumerating a plurality of client devices by a host device in a first configuration process and under a communications protocol, the host device and the client devices being embedded in a user device, wherein enumerating the client devices comprises requesting by the host device and receiving from each client device respective enumeration information describing attributes and functions of each client device;

storing in a storage device local to the host device the received enumeration information in a data structure that maps port identifiers of the host device to the enumeration information received from each of client devices, each port identifier being associated with a respective client device and identifying an embedded signal path through which the host device communicates with the respective client device;

in a second configuration process that, under the communications protocol, requires the host device to re-enumerate the client devices, retrieving the stored enumeration information in place of re-enumerating the client devices by the host, including searching the storage device for respective enumeration information for each client device using the port identifier associated with the respective client device; and enabling operation of each client device based on the respective enumeration information retrieved from the storage device.

2. The method of claim 1, wherein the communication protocol is a universal serial bus (USB) protocol, and each embedded signal path is a USB High-Speed Inter-Chip (HSIC) connection.

3. The method of claim 1, wherein the first configuration process occurs during a boot up of the user device, and the second configuration process occurs during each reboot of the user device, each wake up of the user device, or each restart of the user device.

4. The method of claim 1, wherein the user device is a smart phone.

5. The method of claim 1, wherein the storage device includes volatile memory.

6. The method of claim 1, wherein the storage device includes non-volatile memory.

7. A non-transitory computer-readable storage medium storing instructions operable to cause a host device to perform operations comprising:

enumerating a plurality of client devices in a first configuration process and under a communications protocol, the host device and the client devices being embedded in a user device, wherein enumerating the client devices comprises requesting by the host device and receiving from each client device respective enumeration information describing attributes and functions of each client device;

storing in a storage device local to the host device the received enumeration information in a data structure that maps port identifiers of the host device to the enumeration information received from each of client devices, each port identifier being associated with a respective client device and identifying an embedded signal path through which the host device communicates with the respective client device;

in a second configuration process that, under the communications protocol, requires the host device to re-enumerate the client devices, retrieving the stored enumeration information in place of re-enumerating the client devices by the host, including searching the storage device for respective enumeration information for each client device using the port identifier associated with the respective device; and enabling operation of each client device based on the respective enumeration information retrieved from the storage device.

8. The non-transitory computer-readable storage medium claim 7, wherein the storage device includes volatile memory.

9. The non-transitory computer-readable storage medium of claim 7, wherein the storage device includes non-volatile memory.

10. A user device comprising:
a processor;
a memory device coupled to the processor;
an embedded host device; and
a plurality of embedded client devices connected to the host device, wherein the host device is configured to perform operations comprising:

enumerating the client devices in a first configuration process and under a communications protocol, wherein enumerating the client devices comprises requesting by the host device and receiving from each client device respective enumeration information describing attributes and functions of each client device;

storing in the memory device the received enumeration information in a data structure that maps port identifiers of the host device to the enumeration information received from each of client devices, each port identifier being associated with a respective client device and identifying an embedded signal path through which the host device communicates with the respective client device;

in a second configuration process that, under the communications protocol, requires the host device to re-enumerate the client devices, retrieving the stored enumeration information in place of re-enumerating the client devices by the host, including searching the memory device for respective enumeration information for each client device using the port identifier associated with the respective device; and enabling operation of each client device based on the respective enumeration information retrieved from the storage device.

11. The user device of claim 10, wherein the communication protocol is a universal serial bus (USB) protocol, and each embedded signal path is a USB High-Speed Inter-Chip (HSIC) connection.

12. The user device of claim 10, wherein the first configuration process occurs during a boot up of the user device, and the second configuration process occurs during each reboot of the user device, each wake up of the user device, or each restart of the user device.

13. The host device of claim 10, wherein the user device is a smartphone, and the host device is a single chip application processor within the smartphone that is configured to interact with co-processors or other components of the smartphone.

14. The host device of claim 10, wherein the memory is volatile memory.

15. The host device of claim 10, wherein the memory is non-volatile memory.

* * * * *

UNITED STATES PATENT AND TRADEMARK OFFICE
CERTIFICATE OF CORRECTION

PATENT NO. : 8,943,232 B2
APPLICATION NO. : 13/458501
DATED : January 27, 2015
INVENTOR(S) : Anand Dalal et al.

It is certified that error appears in the above-identified patent and that said Letters Patent is hereby corrected as shown below:

On the Title Page and in the Specification, Column 1, Line 1 (Title), after "SYSTEM" insert -- AND --.

On the Title Page and in the Specification, Column 1, Line 4 (Title), after "OF" insert -- THE --.

In the Claims

Column 16, Line 8 (Claim 8), after "medium" insert -- of --.

Signed and Sealed this
Twenty-ninth Day of September, 2015

Michelle K. Lee
*Director of the United States Patent and Trademark Office*